Dec. 6, 1938.　　　　A. McKONE　　　　2,139,197
MULTIPLE SHOE BRAKE
Filed March 4, 1937　　　　2 Sheets-Sheet 1

Inventor
Archie McKone
By Albert E. Dieterich
and
Theodore H. Rutley
Attorneys

Dec. 6, 1938. A. McKONE 2,139,197
MULTIPLE SHOE BRAKE
Filed March 4, 1937 2 Sheets-Sheet 2

Inventor
Archie McKone
By Albert E. Dieterich
and
Theodore H. Rutley
Attorneys

Patented Dec. 6, 1938

2,139,197

UNITED STATES PATENT OFFICE 2,139,197

MULTIPLE SHOE BRAKE

Archie McKone, Vancouver, British Columbia, Canada, assignor to Pioneer Timber Co., Ltd., Vancouver, British Columbia, Canada Application March 4, 1937, Serial No. 129,035
In Canada February 1, 1937

4 Claims. (Cl. 188—78)

This invention relates to improvements in heavy duty brakes for automotive vehicles such as trucks, busses and some forms of trailers that are called upon to handle massive and heavy loads such as are found in log transportation.

A particular object of my invention has been to design and provide a brake that would stand up under all conditions of load and road without frequent breakdown and the necessity of making frequent repairs thereto.

Another particular object of my invention has been to provide a brake that is capable of exerting a maximum of braking effect without imposing excessive strains upon any particular part of its structure.

Still another object of my invention has been to provide a brake of simple and sturdy construction, robust in application and suitable of use in all types of heavy duty vehicles.

With the foregoing and other objects in view I have invented the brake that is the subject matter of this application and which is further described in the following detailed specification and illustrated in the accompanying drawings forming part of this application, and in which.

Figure 1:
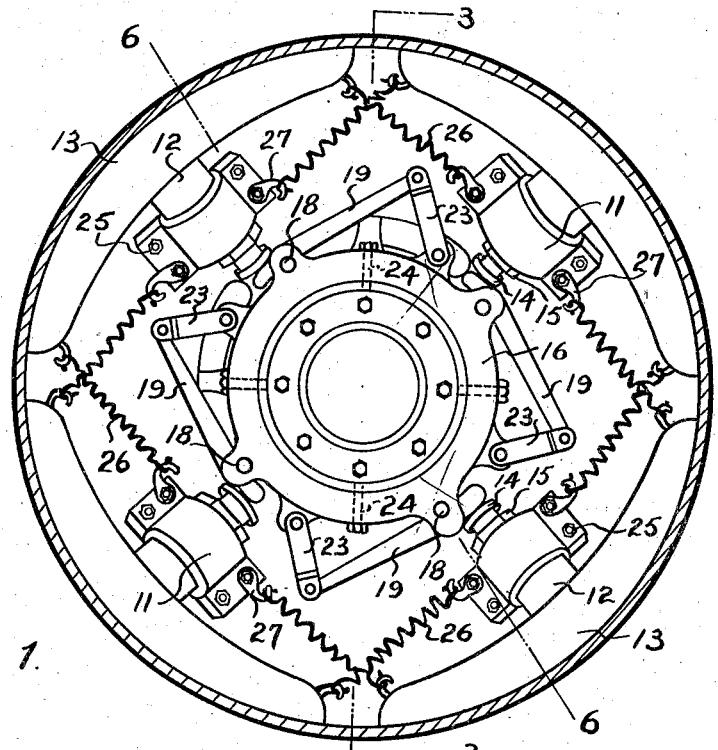
Figure 1 is a plan view of brake mechanism mounted within a brake drum and shows four radially mounted shoes energized by levers and slip rings mounted upon an inner hub concentrically positioned within the brake drum, the inner hub being integral with the back plate of the brake.
Figure 2:
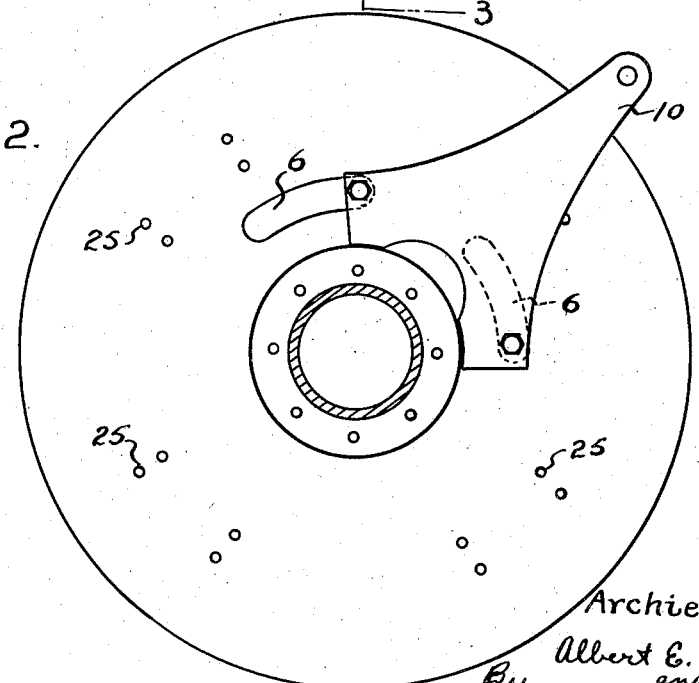
Figure 2 is a rear view of back plate and shows operating lever bolted to lugs of a slip pin ring that project through concentrically formed slots in the back plate.
Figure 3:
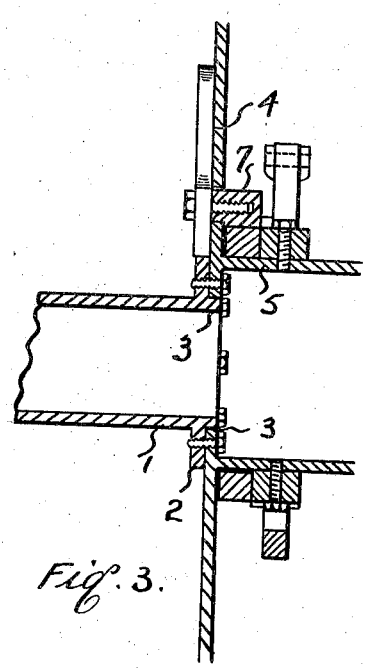
Figure 3 is a cross sectional detail view taken on line 3—3 of Figure 1 and shows the back plate bolted upon the end flange of an axle housing; and this view illustrates the inner hub formed integrally with the back plate and on which is mounted the brake operating mechanism. Brake shoes and mountings omitted for purpose of clarity.
Figure 5:
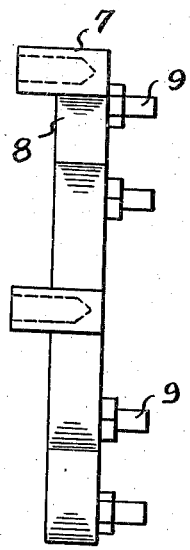
Figure 5 is an end view of slip pin ring showing pins projecting from one side of the ring and the turning lugs projecting from the opposite side thereof.
Figure 6:
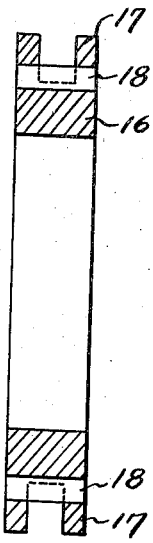
Figure 6 is a cross section of the pivot ring of the brake taken on line 6—6 of Figure 1.
Figure 4:
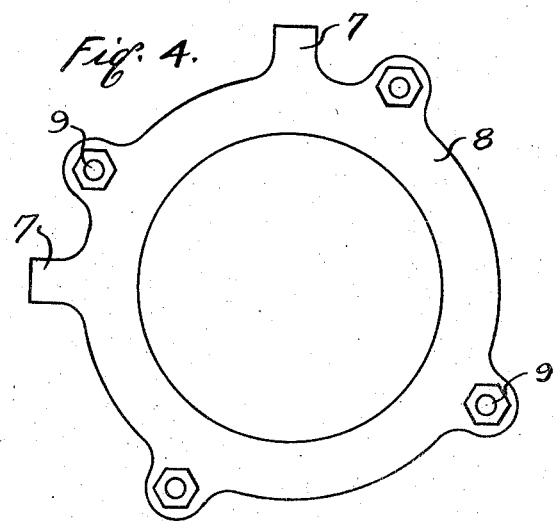
Figure 4 is a plan view of brake actuating slip pin ring showing pins mounted upon the front face thereof and turning lugs formed upon the periphery of the ring.
Figure 7:
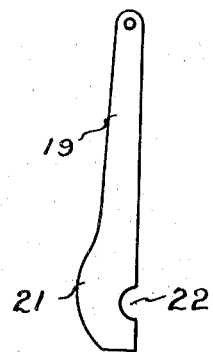
Figure 7 is a side view of one of the pivot levers that actuate the brake shoes. This view illustrates the slot formed in the lower edge of the lever by which it is mounted upon the pivots of the pivot ring.

In these drawings like numerals indicate like parts and the numeral 1 indicates the outer or end portion of an axle housing having a flange 2 formed integral upon the end thereof.

Upon the outer face of the flange 2 is formed a boss 3 on which is mounted and centered a brake back plate 4 having a hollow central hub 5 formed integral therewith.

The back plate 4 is secured to the flange 2 by bolts spaced around inside of the hub 5.

The back plate 4 has two concentrically formed slots 6 for the reception therein of a pair of projecting lugs 7 formed integrally upon a brake actuating slip pin ring 8 that is mounted upon the hub 5.

The slip pin ring 8 has four projecting pins 9 mounted upon the outer face which receive the actuating rods of the brake.

Bolted to the ends of the lugs 7 that project through the back plate 4 is an operating lever 10.

Spaced radially around upon the outer face of the back plate 4 are four brake shoe guides 11 which are secured to the back plate by the bolts 25.

The guides 11 are adapted to receive the stems 12 of the brake shoes 13, the stems 12 and the shoes 13 being formed integrally.

The outer ends of the shoes 13 are connected to helical tension springs 26, which in turn are connected to lugs 27 mounted upon the brake shoe guides 11.

The springs 26 are so arranged that right angled tension is set up upon the ends of the brake shoes 13 as to cause the latter to release their hold whenever the pressure of application is released upon the end of the brake shoe stem 12.

The outer ends of the stems 12 are internally threaded for the reception of a bolt 14 used for taking up wear upon the shoes 13.

The bolt 14 has a hardened head and a lock nut 15 for securing the setting of the bolt after making of adjustments.

Mounted upon the outside of the pin ring 8 and upon the hub 5 is a brake shoe pivot ring 16 having four slotted lugs 17 spaced therearound.

The slotted lugs 17 carry a hardened pivot pin 18 at the bottom of the slots which pin is only partially exposed within the bottom thereof.

Mounted upon the exposed portion of the pins 18 between the lugs 17 are brake shoe actuating levers 19 having a hardened and slightly curved outer end 21 adapted to contact under the hardened head of the adjusting bolt 14.

The levers 19 have a semi-circular slot 22 formed upon the underside adjacent the ends 21 for mounting upon the pivot pins 18.

The outer ends of the levers 19 are engaged by the forked ends of the operating rods 23, the opposite ends of the rods 23 being mounted upon the projecting pins 9 of the brake actuating slip pin ring 8.

The brake shoe pivot ring 16 is secured upon the hub 5 by the bolts 24 and thus loosely confines the brake actuating pin ring between it and the back plate 4.

The outer end of the operating lever 10 is connected, in any suitable manner, with mechanism for operating the brake such as manual operating means or a vacuum booster, or similar type mechanisms, but, as these comprise no part of my invention, they are not illustrated.

The sequence of operation of the brake is as follows:

When the operating lever 10 is turned or pulled forwardly, it turns the brake actuating slip pin ring 8 upon the hub 5, and this action results in the pins 9 acting upon the ends of the rods 23 that are connected to the levers 19 to cause the latter to pivot upon the pins 18 and set up pressure upon the ends of the brake shoe stems 12 to cause the brake shoes 13 to move outwardly and set up braking effort upon the brake drum in which the shoes 13 are mounted.

Having now described my invention, its nature and operation, what I claim and desire to be protected in, by Letters Patent, is:

1. A brake mechanism adapted for positioning within a rotative brake drum, said mechanism comprising a stationary back plate having a central hollow hub portion formed integrally therewith, brake shoe guides mounted radially upon said back plate, brake shoes having stems mounted in said guides, a pivot ring and an actuating ring mounted upon said hub, levers mounted upon said pivot ring in co-operative engagement with the stems of said brake shoes, rods connected to said levers and said actuating ring, and means to move said actuating ring to cause said rods and levers to act upon said brake shoes to cause the latter to set up brake effect upon said brake drum, and means to release said brake effect and retract said brake shoes.

2. A brake mechanism adapted for mounting within a brake drum, said mechanism having a stationary back plate with a hollow central hub formed integrally therewith, guides mounted radially upon said back plate, brake shoes having stems mounted in said guides, means to adjust said stems and brake shoes for taking up wear, a pivot ring and an actuating ring mounted upon said hub, levers mounted upon said pivot ring in co-operative engagement with the adjusting means of said brake shoes, rods connected to said levers and actuating ring, and means connected to said actuating ring to cause the latter to move to set up movement upon said rods and levers to cause the latter to act upon said brake shoes with force sufficient to set up brake action within said brake drum, and means to release said brake effect and retract said brake shoes.

3. A brake mechanism adapted for mounting within a brake drum, said mechanism having a stationary back plate with a hollow central hub formed integrally therewith, said back plate having concentric slots, guides mounted radially upon said back plate, brake shoes having stems mounted in said guides, adjustable means for taking up wear in said brake shoes, a pivot ring and an actuating ring mounted upon said hub, lugs formed on said actuating ring, bosses formed on the end of said lugs adapted to project through the concentric slots formed in said back plate, an actuating lever bolted to said bosses on the back of said back plate, levers mounted upon said pivot ring in co-operative engagement with the stems of said brake shoes, rods connected to said levers and actuating ring, and means connected to said actuating ring to cause the latter to turn on said hub and set up movement upon said rods and levers to cause the latter to actuate the brake shoes to exert brake effect within said brake drum, and means to release and retract said brake shoes.

4. A brake mechanism adapted for mounting within a brake drum, said mechanism having a stationary back plate with a hollow central hub formed integrally therewith, said back plate having concentric slots, guides mounted radially upon said back plate, brake shoes having stems mounted in said guides, adjustable means for taking up wear in said brake shoes, a pivot ring and an actuating ring mounted upon said hub, pins mounted upon one face of said actuating ring, lugs formed on the outer periphery of said ring, bosses formed upon one face of said lugs, said bosses adapted to project through the concentric slots formed in said back plate, an operating lever bolted to said bosses upon the back of said back plate, said operating lever adapted to turn said actuating ring upon said hub, levers pivotally mounted upon said pivot ring in co-operative engagement with the stems of said brake shoes, rods connected to said levers and pins of said actuating ring, means connected to the operating lever of said actuating ring to turn the latter upon its hub mounting whereby said turning movement actuates the rods and levers to energize the brake shoes to set up brake effect within said brake drum, and means to release and retract said brake shoes.

ARCHIE McKONE.